Patented May 26, 1942

2,284,062

UNITED STATES PATENT OFFICE 2,284,062

VAT DYESTUFFS OF THE PHTHALOYL CARBAZOLE SERIES

Walter Mieg, Opladen, and Franz Wieners, Cologne-Stammheim, Germany, assignors to General Aniline & Film Corporation, a corporation of Delaware No Drawing. Application October 14, 1939, Serial No. 299,520. In Germany October 6, 1938

9 Claims. (Cl. 260—316)

This invention relates to vat dyestuffs of the phthaloyl carbazole series.

Our invention is based on the perception that phthaloyl carbazoles of the following general formula

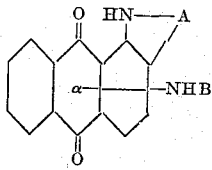

wherein A stands for an arylene radical, B stands for an aroyl radical, substituted in o-position by halogen, and α indicates that the grouping —NHB is linked with the anthraquinone in an α-position represent valuable new vat dyestuffs. It is to be pointed out that the dyestuffs may contain further halogen atoms in the anthraquinone nucleus and/or the arylene radical designated by the letter B. The dyestuffs may contain also methoxy groups or further acylamino groups.

The halogen in o-position of the aroyl radical effects that dyestuffs having more valuable shades are obtained. When additional halogen atoms are present, especially the arylene radical A, a further shifting of the shade to yellow and in many cases an increase of the affinity and of the fastness properties is attained.

Thus, for instance, the carbazole of the 1-benzoylamino-4-β-naphthylamino anthraquinone yields a dull bordo-red. When the benzoyl radical is replaced by the radical of the 2-chlorobenzoic acid a shifting of the shade to a covered red-orange occurs. When halogen is introduced besides in the condensed naphthylamino radical a further shifting of the shade to yellow and an increase of the affinity is observed.

The manufacture of our new dyestuffs proceeds as follows:

α-Arylamino anthraquinones containing in a further α-position, an aroylamino radical substituted in o-position by halogen, preferably by chlorine or bromine, which may carry in the aryl radical and/or anthraquinone nucleus further halogen atoms are treated with carbazole ring closure effecting agents. A further way consists in starting from the corresponding compounds being free from halogen or being partly substituted by halogen treating them with carbazolizing agents and introducing subsequently halogen according to the usual methods known per se, for instance by a treatment with halogen in an organic or aqueous medium or in concentrated sulfuric acid or chlorosulfonic acid or by replacement of the sulfonic acid group or of an amino group by halogen in usual manner or by replacing the aroyl radical by a halogen aroyl radical.

The new dyestuffs dye vegetable fibers yellow, orange-red or brown shades of excellent fastness properties. They are especially suited for preparing water-soluble leuco esters.

The following examples illustrate the invention without, however, restricting it thereto, the parts being by weight:

Example 1

The carbazole obtained from 1-benzoylamino-4-β-naphthylamino-anthraquinone which has been described in Example 6 of the U. S. Patent 2,073,022 dyes cotton from the vat brownish-bordo shades. This dyestuff is saponified in an alkaline medium to the 1-amino-4-β-naphthylamino-anthraquinone carbazole, which crystallizes in blackish needles and dissolves in concentrated sulfuric acid with a blue color. When the sulfuric acid solution is poured into water yellow-brown flakes of a salt are obtained which when washed or treated with alkali turn currant.

36 parts of this amine in 300 parts of nitrobenzene are acylated at 160–170° C. with 18 parts of o-chlorobenzoyl chloride which are added in portions while stirring. When cool the crystals obtained are separated. About 45 parts of a well crystallized dyestuff are obtained. When the orange-colored quinoline solution of this product is poured into water or when the green-colored solution in cold 90 per cent sulfuric acid is precipitated with ice-water a brownish-orange suspension is obtained. The separated dyestuff which has been washed until neutral dyes cotton from the vat very fast covered red-orange shades.

The same dyestuff is obtained when 1-(o-chlorobenzoyl)-amino-4-β-naphthylamino anthraquinone is treated with carbazole ring closure effecting agents according to usual methods. Obviously it is immaterial whether the starting material is obtained from 1-amino-4-β-naphthylamino anthraquinone by acylation with o-chlorobenzoic acid chloride or from 1-(o-chlorobenzoyl)-amino-4-aminoanthraquinone by reaction with β-chloronaphthalene or from 1-(o-chlorobenzoyl)-amino-4-chloro-anthraquinone by reaction with β-naphthylamine or according to any other possible methods.

In the following table a number of dyestuffs is mentioned which have been obtained in an analogous manner:

| Constitution | Color of the solution in | | Color of the vat | Shade on cotton |
| --- | --- | --- | --- | --- |
| | Hot pyridine | Concentrated sulfuric acid | | |
| (a) | Orange-yellow | Dark blue | Brown-orange | Clear yellow-orange. |
| (b) | Brownish-orange | Dark-blue green | Yellow-brown | Yellowish-brown. |
| (c) | Reddish-orange | Grass-green | Orange | Red-orange. |
| (d) | Orange | Grass-green | Orange | Like c, but more covered. |

| Constitution | Color of the solution in | | Color of the vat | Shade on cotton |
|---|---|---|---|---|
| | Hot pyridine | Concentrated sulfuric acid | | |
| (e) [structure with Br] | Reddish-orange | Green | Red-brown | Red-brown, more yellow than the non-brominated product. |
| (f) [structure with Cl, Cl] | Brown-red | Green | Orange | Brown-red. |
| (g) [structure with Cl] | Brownish-yellow | Blue-green | Orange | Clear yellow-brown, more yellow than the non-chlorinated product. |
| (h) [structure with Cl, Cl] | Bordo | Green | Wine-red | Strongly covered brown-red. |

In the following examples the halogenation of some of the above-named carbazoles is described. As a rule the entering halogen atom prefers the condensed naphthylamine nucleus. By the halogenation the shade is shifted to yellow and in some cases also the fastness properties are improved.

Example 2

A mixture consisting of 3,3 parts of sulfuryl chloride and 5 parts of nitrobenzene is added drop by drop at 20° C. to a suspension of 5 parts of the dyestuff of Example 1 in 35 parts of nitrobenzene containing small amounts of iodine as a catalyst. The whole is stirred for 5 hours at the same temperature. The separated crystals contain 2 atoms of chlorine the one in the benzoyl radical and the other probably in the condensed naphthylamine radical. The chlorination product dissolves in boiling pyridine with a brown-orange color and yields on cotton from an orange vat very fast red-brown dyes which are really more yellowish than those obtained with the starting dyestuff.

When the chlorination is effected by passing chlorine gas into a solution of the dyestuff in nitrobenzene at a low temperature, for instance 5° C., likewise more yellowish dyestuffs are obtained.

*Example 3*

4 parts of sulfuryl chloride diluted with 10 parts of nitrobenzene are added slowly at room temperature to a mixture consisting of 5 parts of 1-(2'-chlorobenzoyl)-amino-5-2'-naphthylamino anthraquinone carbazole (Example 1, Table *g*) and 80 parts of nitrobenzene containing some iodine as a catalyst. Then the whole is stirred for about 5 hours at 20° C. with the exclusion of moisture. The reaction product contains about one atom of chlorine and represents an orange vat dyestuff of very good fastness properties which when compared with the starting dyestuff dyes somewhat more yellowish.

*Example 4*

5 parts of the carbazole of Example 1 and some iodine are added to 80 parts of nitrobenzene. A mixture consisting of 2.4 parts of bromine and 20 parts of nitrobenzene are added drop by drop at 45–50° C. while stirring. Then it is stirred for some hours at the same temperature, until a test portion of the precipitate dissolves in boiling pyridine evidently more yellow than the starting product. Accordingly the brominated dyestuff dyes cotton more yellowish than the starting dyestuff.

When the dyestuff of Example 1, Table *d*, is brominated in similar manner a red-brown dyestuff of a somewhat more yellow shade and excellent fastness properties is obtained.

We claim:

1. The dyestuffs of the following formula

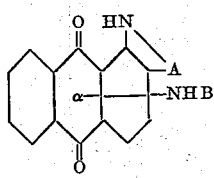

wherein A stands for an arylene radical containing no more than two rings selected from the group consisting of phenylene and naphthalene radicals, B stands for an aroyl radical selected from the group consisting of benzoyl and naphthoyl radicals substituted in o-position by halogen and being otherwise unsubstituted, and α indicates that the grouping —NHB is linked directly with the anthraquinone nucleus in α-position.

2. The dyestuffs of the following formula

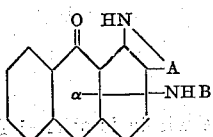

wherein A stands for an arylene radical containing no more than two rings selected from the group consisting of phenylene and naphthalene radicals, B stands for an aroyl radical selected from the group consisting of benzoyl and naphthoyl radicals substituted in o-position by chlorine and being otherwise unsubstituted, and α indicates that the grouping —NHB is linked directly with the anthraquinone nucleus in α-position.

3. The dyestuffs of the following formula

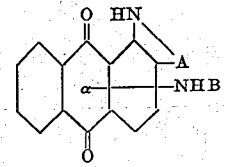

wherein A stands for an arylene radical containing no more than two rings selected from the group consisting of phenylene and naphthalene radicals, B stands for an aroyl radical selected from the group consisting of benzoyl and naphthoyl radicals substituted in o-position by bromine and being otherwise unsubstituted, and α indicates that the grouping —NHB is linked directly with the anthraquinone nucleus in α-position.

4. The dyestuffs of the following formula

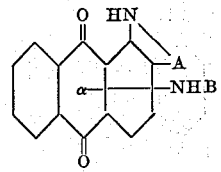

wherein A stands for a naphthylene radical containing no more than two rings, B stands for an aroyl radical selected from the group consisting of benzoyl and naphthoyl radicals substituted in o-position by halogen and being otherwise unsubstituted, and α indicates that the grouping —NHB is linked directly with the anthraquinone nucleus in α-position.

5. The dyestuffs of the following formula

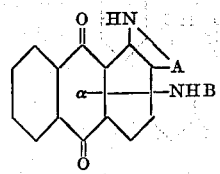

wherein A stands for a naphthylene radical containing no more than two rings, B stands for a benzoyl radical substituted in o-position by halogen and being otherwise unsubstituted, and α indicates that the grouping —NHB is linked directly with the anthraquinone nucleus in α-position.

6. The dyestuffs of the following formula

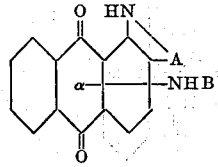

wherein A stands for a naphthylene radical containing no more than two rings, B stands for a benzoyl radical substituted in o-position by chlorine and being otherwise unsubstituted, and α indicates that the grouping —NHB is liked directly with the anthraquinone nucleus in α-position.

7. The dyestuffs of the following formula

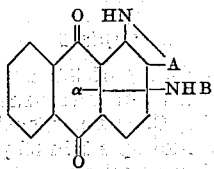

wherein A stands for a naphthylene radical containing no more than two rings, B stands for a benzoyl radical substituted in o-position by bromine and being otherwise unsubstituted, and a indicates that the grouping —NHB is linked directly with the anthraquinone nucleus in α-position.
8. The compound of the following formula:
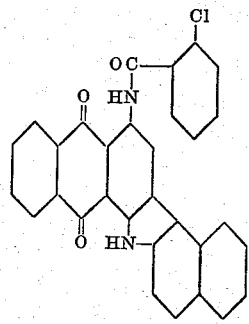
9. The compound of the following formula:
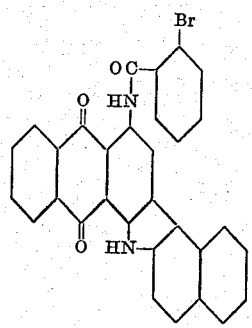
WALTER MIEG.
FRANZ WIENERS.